C. O. BERGSTROM.
BALANCING RING.
APPLICATION FILED AUG. 12, 1912.
1,191,393.
Patented July 18, 1916.
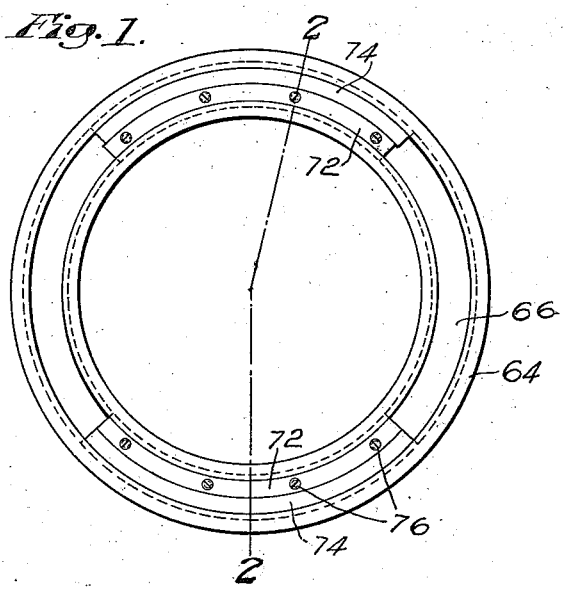
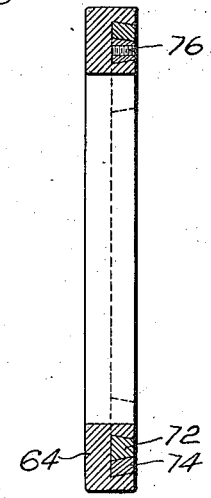

UNITED STATES PATENT OFFICE.

CARL O. BERGSTROM, OF BOSTON, MASSACHUSETTS, ASSIGNOR TO B. F. STURTEVANT COMPANY, OF BOSTON, MASSACHUSETTS, A CORPORATION OF MASSACHUSETTS.

BALANCING-RING.

1,191,393.  Specification of Letters Patent.  Patented July 18, 1916.

Application filed August 12, 1912. Serial No. 714,618.

*To all whom it may concern:*

Be it known that I, CARL O. BERGSTROM, a citizen of the United States, residing at Boston, in the county of Suffolk and State of Massachusetts, have invented certain new and useful Improvements in Balancing-Rings; and I do hereby declare the following to be a full, clear, and exact description of the invention, such as will enable others skilled in the art to which it appertains to make and use the same.

The present invention relates to balancing rings, and more particularly to balancing rings for high speed machines, such as high speed electric motors or generators.

The object of the invention is to produce a balancing ring which is capable of nice adjustments, in which the parts are firmly and compactly held together and which is economical to manufacture.

With the above object in view, the present invention consists in the improvements in balancing rings hereinafter described and particularly pointed out in the claims.

In the drawings which illustrate the preferred embodiment of the invention, Figure 1 is an end view of the balancing ring; and Fig. 2 is a section taken on the line 2—2 of Fig. 1.

The body of the balancing ring consists of an unbroken, one-piece ring 64 which is fitted over the rotating part to be balanced and is rigidly secured thereto, preferably by heating the ring 64 and shrinking it in place. In the side of the ring 64 is an annular, undercut slot 66 of a substantially trapezoidal cross section. Balancing pieces 72 and 74 are arranged to be fitted in the slot 66. These balancing pieces are of arcuate shape and each subtends an angle of about 90 degrees. Each balancing piece 72 is of a substantially trapezoidal cross section being tapered opposite to the tapering of the trapezoidal cross section of the groove 66. Each balancing piece 74 is of a substantially rhomboidal cross section. The balancing pieces 72 and 74 are of such size and shape that when they are placed side by side they completely fill the section of the groove 66 which they occupy. The balancing pieces 72 and 74 are inserted in the groove 66 by placing them in the groove substantially end to end and then sliding them together until they lie side by side. In order to clamp the balancing pieces 72 and 74 firmly in place, screws 76 are threaded through the pieces 72 and are arranged to be turned against the bottom of the groove 66 to force the balancing pieces 72 outward like a wedge between the walls of the groove and the other balancing pieces 74. As each ring 64 is a solid ring and the balancing pieces are firmly wedged in an under-cut groove in its side, the composite ring 60 is capable of withstanding the severest conditions of vibration and rapid rotation. As shown in Fig. 1, there are two sets of balancing pieces. When these two sets of balancing pieces are located in the slot 66 diametrically opposite, the ring is balanced. If the rotating part to which the ring is secured is unbalanced and needs to be compensated, the two sets of balancing pieces are moved toward each other to the same side of the ring, thus unbalancing the ring and compensating for the unbalanced condition of the rotating part.

While the preferred embodiment of the present invention has been specifically illustrated and described, the present invention is not limited to the construction constituting its preferred embodiment, but may be embodied in other constructions within the scope of the invention as defined in the following claims:

1. A balancing ring having, in combination, a metal ring having an undercut groove, arcuate balancing pieces fitted side by side to completely fill a section of the groove, and means for clamping the balancing pieces in the groove, substantially as described.

2. A balancing ring having, in combination, a metal ring having an undercut groove of substantially trapezoidal cross section, an arcuate balancing piece of substantially trapezoidal cross section adapted to be received in the groove, a second arcuate balancing piece of substantially rhomboidal cross section arranged to be fitted beside the first balancing piece to completely fill a section of the groove, substantially as described.

3. A balancing ring having, in combination, a metal ring having in its side an undercut groove of substantially trapezoidal cross section, an arcuate balancing piece of substantially trapezoidal cross section adapted to be received in the groove, a second arcuate balancing piece of substantially rhomboidal cross section arranged to be fitted beside the first balancing piece to completely fill a section of the groove, and means for wedging the two balancing pieces against each other and against the sides of the groove to clamp them in place, substantially as described.

4. A balancing ring having, in combination, a metal ring having in its side an under-cut groove of substantially trapezoidal cross section, an arcuate balancing piece of substantially trapezoidal cross section adapted to be received in the groove, a second arcuate balancing piece of substantially rhomboidal cross section arranged to be fitted beside the first balancing piece to completely fill a section of the groove and retain the first balancing piece in place, and a clamping screw in the first balancing piece arranged to be turned against the bottom of the groove to force the first balancing piece outward and wedge the two balancing pieces in place, substantially as described.

CARL O. BERGSTROM.

Witnesses:
GEORGE E. STEBBINS,
MIRIAM CLEMENT.